US012631944B2

(12) United States Patent
Pan

(10) Patent No.: US 12,631,944 B2
(45) Date of Patent: May 19, 2026

(54) MONITOR CAMERA MOUNT

(71) Applicant: Tiancheng Pan, Cixi City (CN)

(72) Inventor: Tiancheng Pan, Cixi City (CN)

( * ) Notice: Subject to any disclaimer, the term of this patent is extended or adjusted under 35 U.S.C. 154(b) by 184 days.

(21) Appl. No.: 18/444,802

(22) Filed: Feb. 19, 2024

(65) Prior Publication Data

US 2025/0036010 A1    Jan. 30, 2025

(30) Foreign Application Priority Data

Jan. 12, 2024    (CN) .......................... 202420086244.5

(51) Int. Cl.
| | |
|---|---|
| *G03B 17/56* | (2021.01) |
| *F16M 11/20* | (2006.01) |
| *F16M 13/02* | (2006.01) |

(52) U.S. Cl.
CPC ....... *G03B 17/561* (2013.01); *F16M 11/2021* (2013.01); *F16M 11/2092* (2013.01); *F16M 13/02* (2013.01); *F16M 2200/024* (2013.01)

(58) Field of Classification Search
CPC ............. G03B 17/561; F16M 11/2021; F16M 11/2092; F16M 13/02; F16M 11/10; G06F 1/1605
See application file for complete search history.

(56) References Cited

U.S. PATENT DOCUMENTS

| | | | | |
|---|---|---|---|---|
| 3,731,897 | A * | 5/1973 | Price | G03B 17/561 |
| | | | | 396/419 |
| 6,354,544 | B1 * | 3/2002 | Muzila | F16M 11/105 |
| | | | | 396/428 |
| 2006/0001743 | A1 | 1/2006 | Lee | |
| 2006/0072007 | A1 * | 4/2006 | Gilor | F16M 11/10 |
| | | | | 348/61 |
| 2008/0315053 | A1 | 12/2008 | King | |
| 2016/0070964 | A1 | 3/2016 | Conrad | |
| 2023/0046711 | A1 * | 2/2023 | Wallace | G06F 1/1605 |
| 2024/0118592 | A1 * | 4/2024 | Liu | F16M 13/022 |

FOREIGN PATENT DOCUMENTS

EP          1813852 A1 *  8/2007  ......... F16M 11/2092

* cited by examiner

*Primary Examiner* — Christopher E Mahoney

(57) ABSTRACT

Disclosed is a monitor camera mount including an adjustment assembly, a mounting assembly and a fitting assembly, the mounting assembly being used for mounting to a monitor, the fitting assembly being connected to the mounting assembly via the adjustment assembly, where the adjustment assembly includes a fixed rail arranged obliquely upwards in a direction away from the mounting assembly, and the fitting assembly moves along the fixed rail to adjust a mounting angle of the fitting assembly. The present invention is simply constructed, and by providing a mounting surface, the center of gravity of a camera or a webcam can always be kept at the rear when the camera or the webcam is kept in a horizontal or slightly downward inclined state, so that the camera or the webcam cannot easily fall forward; an angle of the mounting surface and a connecting panel is adjustable to facilitate dismounting and carrying.

8 Claims, 4 Drawing Sheets

MONITOR CAMERA MOUNT

TECHNICAL FIELD

The present invention relates to the field of monitor mounted mounts, and in particular, to a monitor camera mount.

BACKGROUND

A camera, known as a device that forms an image using a principle of optical imaging and records the image using a negative film, is an optical device used for photography. Existing cameras are often used in conjunction with computers, which when in use, often need an adjustment of angle to adjust a camera shooting range, and there would be an unstable center of gravity if the camera is tilted or is equipped with a long lens.

Existing cameras or webcams are placed directly on a computer desktop, or placed on the computer desktop via a stand, or mounted on a computer screen via an existing mount. The first two take up space on the computer desktop; the existing mount used in the third way has the following disadvantages: the top of the existing mount is too narrow and fewer types of monitors can be adapted, especially curved screens, etc.; the existing mount assembled with a camera or a webcam easily falls off since the center of gravity is inclined forward; most of the existing mounts are fixed on the desktop or on the back of a monitor for firm mounting, which makes mounting, disassembly and carrying inconvenient. It is therefore important to obtain a monitor camera mount that overcomes the above-mentioned drawbacks.

SUMMARY

In order to solve at least one of the above technical problems, the present invention provides a monitor camera mount including an adjustment assembly, a mounting assembly and a fitting assembly, the mounting assembly being used for mounting to a monitor, the fitting assembly being connected to the mounting assembly via the adjustment assembly, where the adjustment assembly includes a fixed rail arranged obliquely upwards in a direction away from the mounting assembly, and the fitting assembly moves along the fixed rail to adjust a mounting angle of the fitting assembly.

The mounting assembly is pivotally connected to the adjustment assembly. The adjustment assembly is pivotally connected to the mounting assembly and locked via a locking mechanism to adjust an angle of connection between the adjustment assembly and the mounting assembly.

The fixed rail includes an arcuate rail and/or a linear oblique rail, i.e., the fixed rail can be provided in a single form as an arcuate rail.

The adjustment assembly includes a base plate on which the fixed rail is mounted.

The fitting assembly includes a first connecting rod, the camera or webcam is detachably connected to the fixed rail via the first connecting rod, the fixed rail includes a rail body on which a rail slot for the movement of the fitting assembly is formed, a mounting groove is provided at the bottom of the first connecting rod, and the monitor camera mount further includes a first fastener that acts on the fitting assembly along a first side to a second side in a thickness direction of the rail slot to clamp and fix the fitting assembly to the rail and/or slidably adjust the fitting assembly along the fixed rail. A mounting mount for connecting to a camera or a webcam is mounted on the first connecting rod, and the mounting mount is a tripod head.

By the above-mentioned technical solution, the tripod head is mounted on the top of the first connecting rod to connect the camera or the webcam. An arcuate member is hinged outside the first fastener to facilitate rotation of the limiting portion when the first connecting rod moves along the rail slot.

The mounting assembly includes an adjustment plate assembly including a first limiting plate and a first adjustment plate arranged at an angle to the first limiting plate, the first adjustment plate is connected to the mounting assembly via an adjustment structure to adjust the distance between the first limiting plate and the mounting assembly to clamp the monitor; the adjustment structure includes a plurality of limiting grooves provided on the first adjustment plate and a limiting member connected to the mounting assembly, and limiting protrusions cooperating with the limiting grooves are provided on the limiting member.

The mounting assembly includes a side plate, a first channel is provided on the side plate, the first adjustment plate passes through the first channel and moves axially on the first channel, a second channel is provided on the adjustment assembly on the first channel, the limiting member is hinged in the second channel, and a torsion spring is fitted at the hinge, and a portion having a limiting protrusion can pass out of the second channel and cooperate with the limiting groove to limit the distance between the first limiting plate and the adjustment assembly to clamp the monitor.

The monitor camera mount further includes a rotary shaft, a first rotary channel is provided on a side plate of the adjustment assembly, a second rotary channel is provided on a base plate of the mounting assembly, and the rotary shaft is inserted into the first rotary channel and the second rotary channel so that the mounting assembly is pivotally connected to the adjustment assembly. The locking mechanism includes a third fastener and a limiting boss provided at the end of the rotary shaft, a limiting surface cooperating with the limiting boss is provided on an inner wall of the first rotary channel to limit the rotary shaft from rotating circumferentially, and the third fastener is in threaded connection with the rotary shaft so that the adjustment assembly and the mounting assembly are limited between an end surface of the third fastener and the limiting boss to limit rotation of the adjustment assembly and the mounting assembly at an angle.

The monitor camera mount further includes a support plate, where the support plate is telescopically connected to the adjustment assembly so that the support plate cooperates with the first adjustment plate to abut against the back of the monitor; the support plate is provided with a telescopic guide rail, the monitor camera mount further includes a second fastener connected to the adjustment assembly, the second fastener, passing through the telescopic guide rail, is connected to a fourth fastener, the fourth fastener is provided with a connection limiting portion, and the fourth fastener locks the support plate between the adjustment assembly and the connection limiting portion of the fourth fastener.

A fulcrum between the mounting assembly and the monitor is provided with a first adhesive tape, and/or a fulcrum between the first limiting plate and the monitor is provided with a second adhesive tape; and/or a fulcrum between the support plate and the monitor is provided with a third adhesive tape.

The adhesive tape can not only achieve anti-skid and buffering protection function, but also can increase the stability of mounting when the adhesive tape is pressed to be deformed to stabilize the clamping when clamped on the monitor.

Compared with the prior art, the advantageous effects of the present invention are: the present invention is simply constructed, and the present invention can be mounted on a monitor by the cooperation of an adjustment plate assembly and an adjustment assembly, and can be fitted on a curved screen with an adhesive tape being arranged without causing wear on the monitor; according to the present invention, the fixed rail is arranged such that when the camera or the webcam is kept in a horizontal or slightly downward inclined state, the center of gravity can always be kept at the rear, and it is not easy to fall forward; an angle between the base plate and the side plate is adjustable to facilitate folding, dismounting and carrying.

Figure 1:
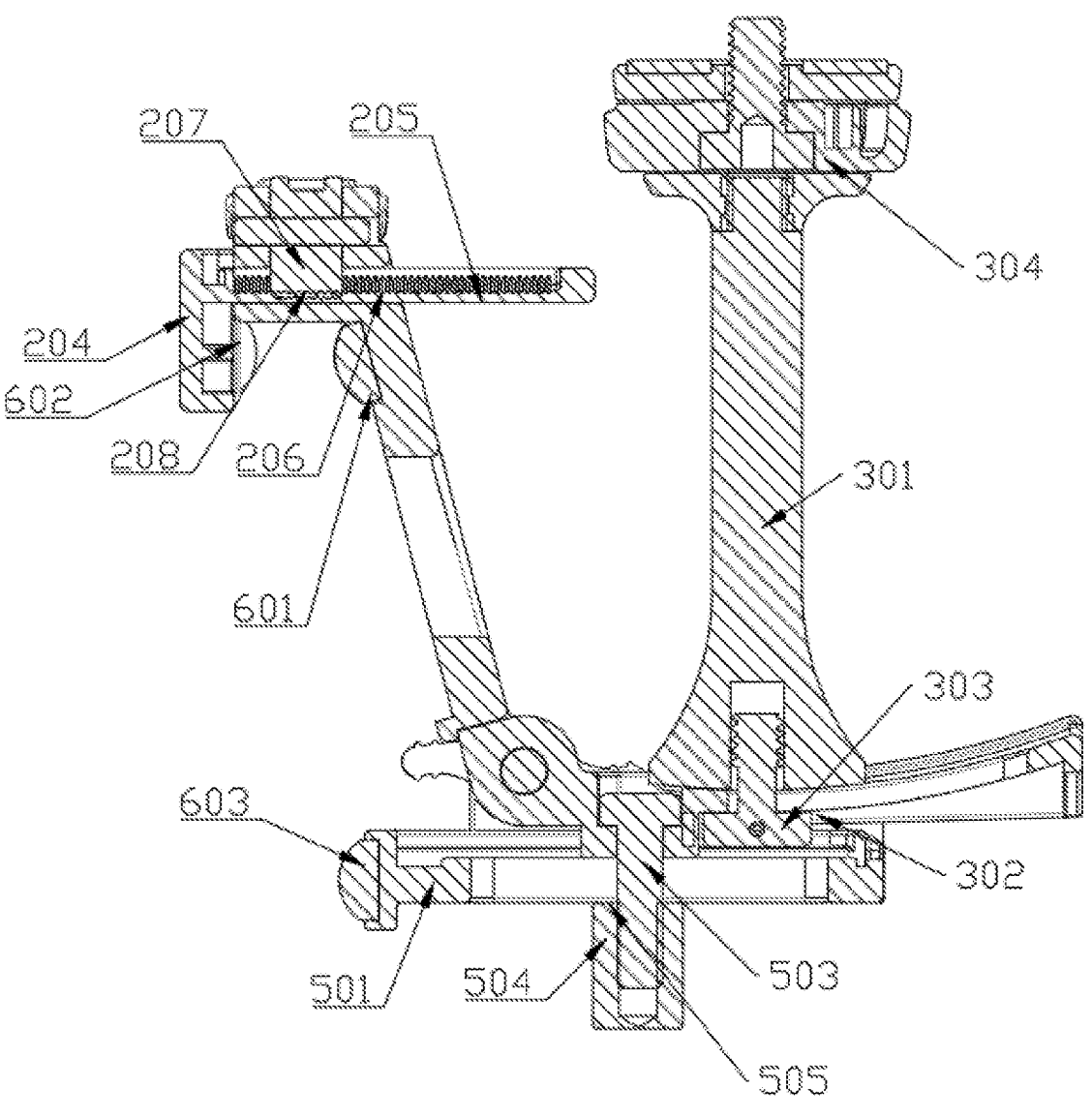
FIG. 1 is a schematic cross-sectional view according to the present invention.
Figure 2:
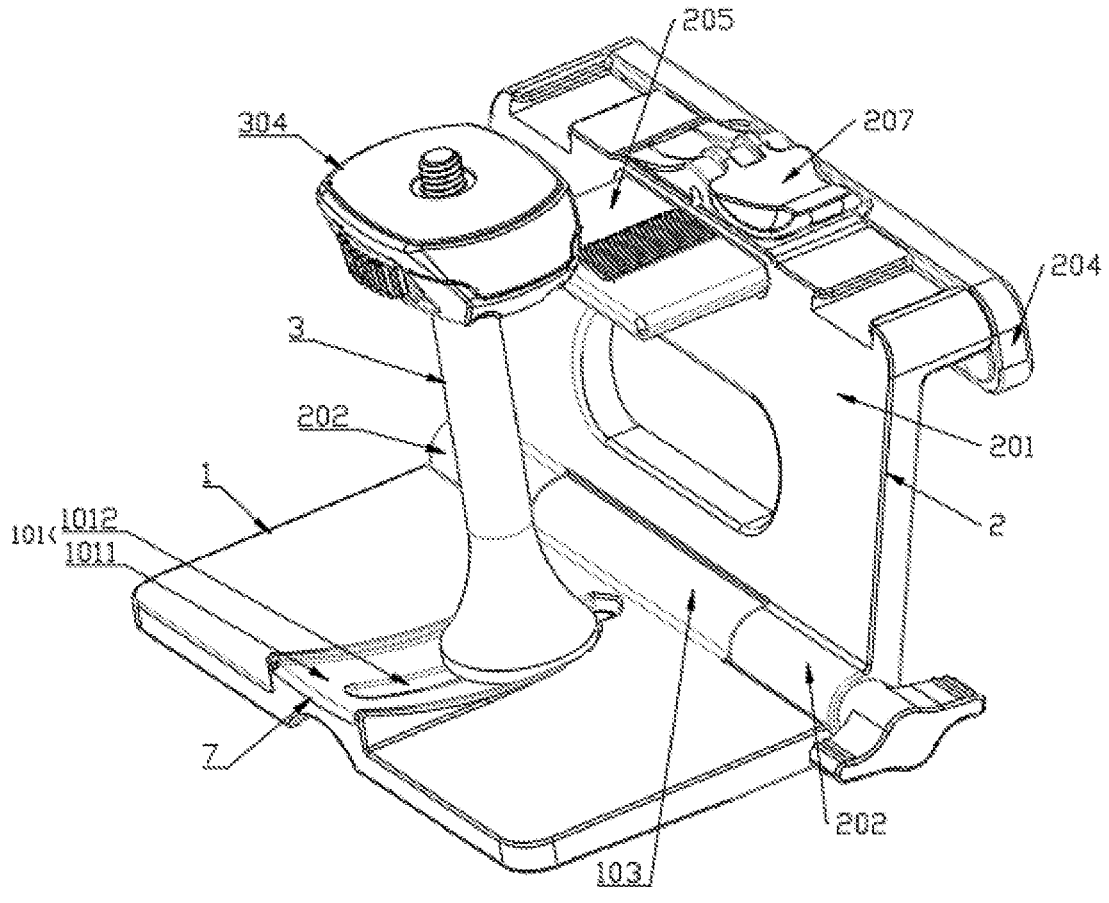
FIG. 2 is a first perspective view according to the present invention.
Figure 3:
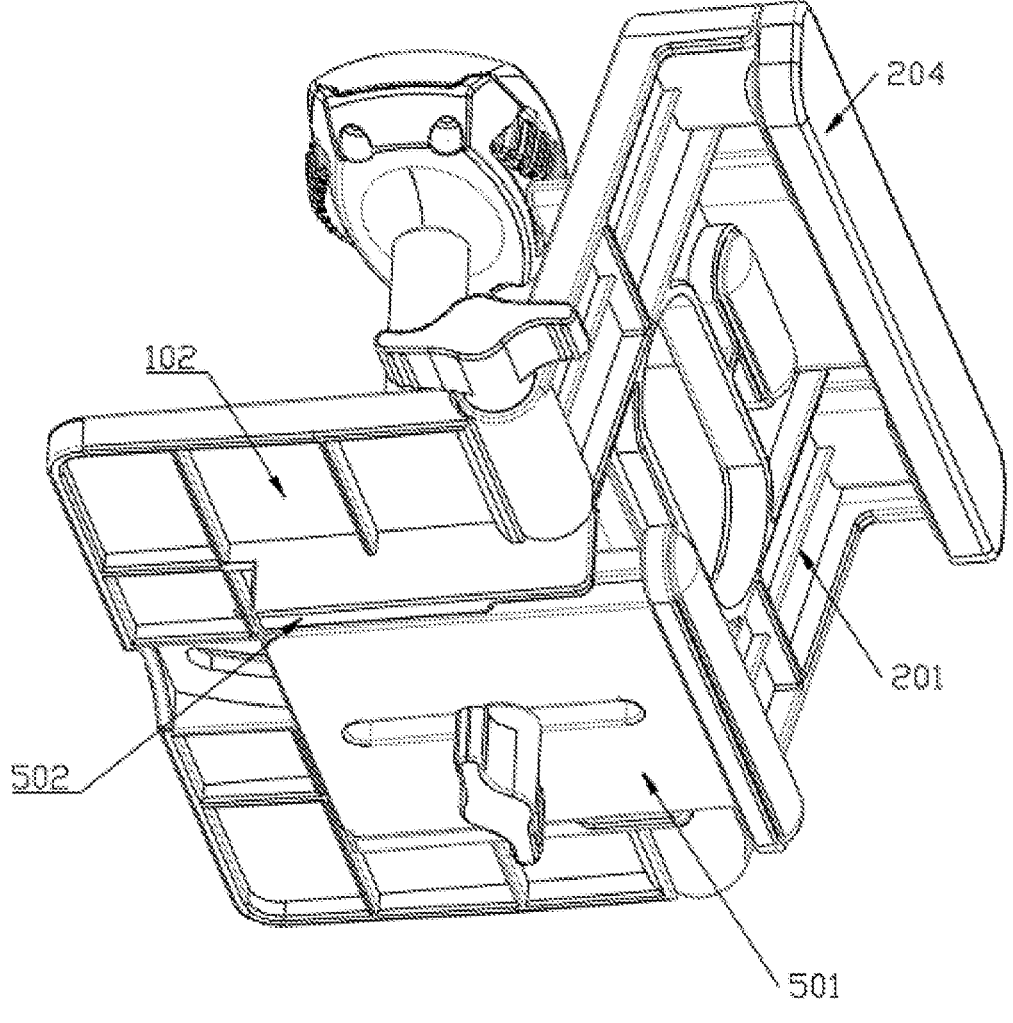
FIG. 3 is a second perspective view according to the present invention.
Figure 4:
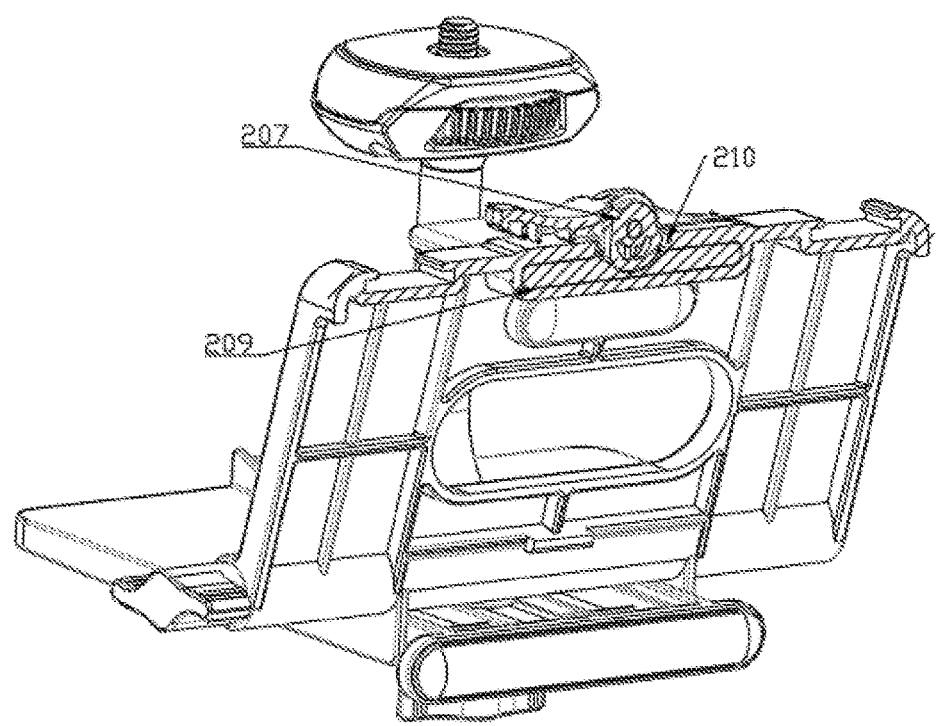
FIG. 4 is a first cross-sectional perspective view according to the present invention.

REFERENCE NUMERALS 1 adjustment assembly; 101 fixed rail; 1011 rail body; 1012 rail slot; 102 base plate; 103 first cylinder; 104 first rotary channel;

2 mounting assembly; 201 side plate; 202 second cylinder; 203 second rotary channel; 204 first limiting plate; 205 first adjustment plate; 206 limiting groove; 207 limiting member; 208 limiting protrusion; 209 first channel; 210 second channel;

3 fitting assembly; 301 first connecting rod; 302 mounting groove; 303 first fastener; 304 mounting mount;

401 rotary shaft; 402 third fastener; 403 limiting boss; 404 limiting surface;

501 support plate; 502 telescopic guide rail; 503 second fastener; 504 fourth fastener; 505 connection limiting portion;

601 first adhesive tape; 602 second adhesive tape; 603 third adhesive tape;

7 concave arc.

DESCRIPTION OF THE EMBODIMENTS

In order that a person skilled in the art may better understand the present invention and that the scope of the present invention that is claimed may be more clearly defined, the present invention is described in detail below with respect to certain specific embodiments of the present invention. It should be noted that the following description is only a few embodiments of the present invention, and the specific direct description of the related structures is only for the convenience of understanding the present invention, and the specific features do not, of course, directly limit the implementation scope of the present invention.

With reference to the drawings, the present invention adopts the following technical solution: a monitor camera mount including an adjustment assembly 1, a mounting assembly 2 and a fitting assembly 3, the mounting assembly 2 being used for mounting to a monitor, the fitting assembly 3 being connected to the mounting assembly 2 via the adjustment assembly 1, where the adjustment assembly 1 includes a fixed rail 101, the fixed rail 101 is arranged obliquely upwards in a direction away from the mounting assembly 2, and the fitting assembly 3 moves along the fixed rail 101 to adjust a mounting angle of the fitting assembly 3.

The mounting assembly 2 is pivotally connected to the adjustment assembly 1.

The adjustment assembly 1 is pivotally connected to the mounting assembly 2 and locked via a locking mechanism to adjust an angle of connection between the adjustment assembly 1 and the mounting assembly 2.

The locking mechanism includes a third fastener 402 and a limiting boss 403 fixed at the end of the rotary shaft 401, a limiting surface 404 cooperating with the limiting boss 403 is provided on an inner wall of the first rotary channel 104 to limit the rotary shaft 401 from rotating circumferentially, and the third fastener 402 is in threaded connection with the rotary shaft 401 so that the adjustment assembly 1 and the mounting assembly 2 are limited between an end surface of the third fastener 402 and the limiting boss 403 to limit rotation of the adjustment assembly 1 and the mounting assembly 2 at an angle. In the present embodiment, the first cylinder 103 is positioned between two second cylinders 202. In the present embodiment, the limiting boss 403 has a hexagonal nut structure, the limiting surface 404 forms a hexagon cooperating with the nut structure, or the limiting surface 404 is composed of a plane cooperating with the nut structure and other cambered surfaces.

In addition, a first cylinder 103 is integrally formed on the base plate 102 of the adjustment assembly 1, a first rotary channel 104 is provided on the first cylinder 103, a second cylinder 202 is integrally formed on a side plate 201 of the mounting assembly 2, a second rotary channel 203 is provided on the second cylinder 202, and includes a rotary shaft 401 inserted into the first rotary channel 104 and the second rotary channel 203 to enable the mounting assembly 2 to be pivotally connected to the adjustment assembly 1.

In the present embodiment, the first and second rotary channels 104, 203 are provided in the first and second cylinders 103, 202, or the first and second rotary channels 104, 203 are partially communicated with the outside, and the communicated portion is less than one-half circumference.

The above-mentioned structure realizes the adjustment of angle and limiting between the base plate 102 and the side plate 201, and an included angle between the two can be freely adjusted to be ≤120° according to needs.

The fixed rail 101 includes an arcuate rail and/or a linear oblique rail, i.e., the fixed rail 101 can be provided in a single form as an arcuate rail, and in the present embodiment, the fixed rail 101 is an arcuate rail. As a preferred implementation, the first connecting rod 301 and the arcuate rail are provided in a normal direction, and the arcuate rail is connected tangentially to the base plate 102.

A planar rail may also be included to be connected to an arcuate rail or a linear oblique rail, i.e. a plurality of arcuate rails and/or linear oblique rails are spaced apart from planar rails.

Figure 5:
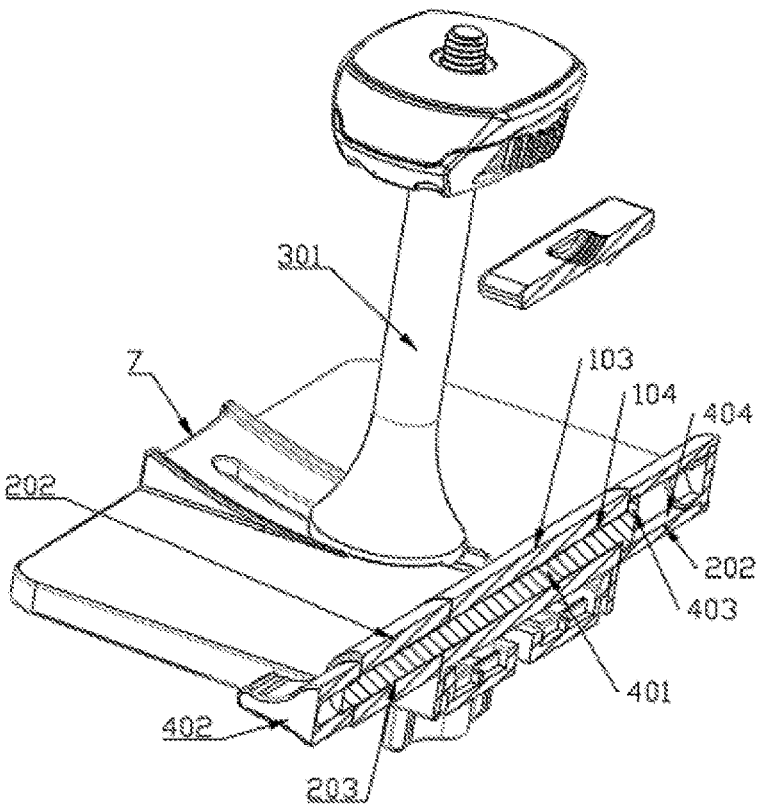
FIG. 5 is a second cross-sectional perspective view according to the present invention.

The arcuate rails and/or linear oblique rails have a concave arc 7 in a cross section, as shown in FIG. 5.

The adjustment assembly 1 includes a base plate 102 on which the fixed rail 101 is mounted.

The fitting assembly 3 includes a first connecting rod 301, the camera or webcam is detachably connected to the fixed rail 101 via the first connecting rod 301, the fixed rail 101 includes a rail body 1011 on which a rail slot 1012 for the movement of the mounting assembly 3 is formed, a mounting groove 302 is provided at the bottom of the first connecting rod 301, and the monitor camera mount further includes a first fastener 303 that acts on the fitting assembly 3 along a first side to a second side in a thickness direction of the rail slot 1012 to clamp and fix the fitting assembly 3 to the rail and/or slidably adjust the fitting assembly 3 along the fixed rail 101. A mounting mount 304 for connecting to a camera or a webcam is mounted on the first connecting rod 301, and the mounting mount 304 can be a tripod head. The connection between the first fastener 303 and the first connecting rod 301 is a screw connection, a snap connection or a magnetic suction connection.

By the above-mentioned technical solution, the tripod head is mounted on the top of the first connecting rod 301 to connect the camera or the webcam. An arcuate member is hinged outside the first fastener 303 to facilitate rotation of the limiting portion when the first connecting rod 301 moves along the rail slot 1012. In the present embodiment, the rail is provided in the middle of the rail body 1011, two sides of the rail are fixed with the base plate 102, so that the rail body 1011 is in a wedge-shaped bump shape, or one side of the rail body 1011 is fixedly connected with the base plate 102, and a thickness surface of the rail body 1011 is clamped between the fitting assembly 3 and the first fastener 303 to also achieve limit fixing.

The mounting assembly 2 includes an adjustment plate assembly including a first limiting plate 204 and a first adjustment plate 205 arranged at an angle to the first limiting plate 204, the first adjustment plate 205 is connected to the mounting assembly 2 via an adjustment structure to adjust the distance between the first limiting plate 204 and the mounting assembly 2 to clamp the monitor; the adjustment structure includes a plurality of limiting grooves 206 provided on the first adjustment plate 205, a limiting member 207 connected to the mounting assembly 2, and limiting protrusions 208 cooperating with the limiting grooves 206 are provided on the limiting member 207. In the present embodiment, the first limiting plate 204 and the first adjustment plate 205 are vertically fixed.

The mounting assembly 2 includes a side plate 201, a first channel 209 is provided on the side plate 201, the first adjustment plate 205 passes through the first channel 209 and moves axially on the first channel 209, a second channel 210 is provided on the adjustment assembly 1 on the first channel 209, the limiting member 207 is hinged in the second channel 210, and a torsion spring is fitted at the hinge, and a portion having a limiting protrusion 208 can pass out of the second channel 210 and cooperate with the limiting groove 206 to limit the distance between the first limiting plate 204 and the adjustment assembly 1 to clamp the monitor.

The adjustment plate assembly is not limited to the above form, but may also take the form of a clip to clamp the side plate 201 to the monitor.

The monitor camera mount further includes a support plate 501, where the support plate 501 is telescopically connected to the adjustment assembly 1 so that the support plate 501 cooperates with the first adjustment plate 205 to abut against the back of the monitor; the support plate 501 is provided with a telescopic guide rail 502, the monitor camera mount further includes a second fastener 503 connected to the adjustment assembly 1, the second fastener 503, passing through the telescopic guide rail 502, is connected to a fourth fastener 504, the fourth fastener 504 is provided with a connection limiting portion 505, and the fourth fastener locks the support plate 501 between the adjustment assembly 1 and the connection limiting portion 505 of the fourth fastener. The support plate 501 can adjust the telescopic length on the adjustment assembly 1 as required. The second connecting rod may be of a bolt structure.

As shown in FIG. 1, the first fastener 303 is provided between the support plate 501 and the base plate 102, and when it is necessary to adjust the first connecting rod 301 of the fitting assembly 3, the support plate 501 can be extended to the longest state or directly withdrawn, and then the position of the fitting assembly 3 on the fixed rail 101 can be adjusted.

A fulcrum between the mounting assembly 2 and the monitor is provided with a first adhesive tape 601, and/or a fulcrum between the first limiting plate 204 and the monitor is provided with a second adhesive tape 602; and/or a fulcrum between the support plate 501 and the monitor is provided with a third adhesive tape 603.

The adhesive tape can not only achieve anti-skid and buffering protection function, but also can increase the stability of mounting when the adhesive tape is pressed to be deformed to stabilize the clamping when clamped on the monitor.

The third and fourth fasteners may be of wing nut structures.

According to the present invention, with the mounting assembly 2 being connected to the back of the monitor, and it is required to keep the camera horizontally placed, the first connecting rod 301 is adjusted to a position close to the side plate 201 and is then used; when it is necessary to keep the camera lens slightly downwards, the first connecting rod 301 is adjusted to a position farther away from the side plate 201 and is then used; when a camera with a long lens is used, the first connecting rod 301 is adjusted to a position as far away from the side plate 201 as possible to keep the center of gravity at the rear, so that it is not easy to tilt forward.

Compared with the prior art, the advantageous effects of the present invention are: the present invention is simply constructed, and the present invention can be mounted on a monitor by the cooperation of an adjustment plate assembly and an adjustment assembly 1, for example, a first limiting plate 204 and a first adjustment plate 205 are adjusted to adjust the distance between a first adhesive tape 601 and a second adhesive tape 602 to be adapted to be mounted to a curved screen; according to the present invention, the fixed rail 101 is arranged such that when the camera or the webcam is kept in a horizontal or slightly downward inclined state, the center of gravity can always be kept at the rear, and it is not easy to fall forward; an angle between base plate 102 and the side plate 201 is adjustable to facilitate folding, dismounting and carrying.

The above description is not intended to limit the present invention, and the present invention is not limited to the above examples, and variations, modifications, additions and substitutions which may be made by a person skilled in the art within the substantial scope of the present invention are also within the scope of the present invention.

What is claimed is:

1. A monitor camera mount, comprising an adjustment assembly, a mounting assembly and a fitting assembly the mounting assembly being used for mounting to a monitor, the fitting assembly being connected to the mounting assembly via the adjustment assembly, wherein the adjustment assembly comprises a fixed rail arranged obliquely upwards in a direction away from the mounting assembly, and the fitting assembly moves along the fixed rail to adjust a mounting angle of the fitting assembly; and the adjustment assembly is pivotally connected to the mounting assembly and locked via a locking mechanism to adjust an angle of connection between the adjustment assembly and the mounting assembly.

2. The monitor camera mount according to claim 1, wherein the fixed rail comprises an arcuate rail and/or a linear oblique rail.

3. The monitor camera mount according to claim 2, wherein the fixed rail comprises a rail body on which a rail slot for the movement of the fitting assembly is formed, and the monitor camera mount further comprises a first fastener that acts on the fitting assembly along a first side to a second side in a thickness direction of the rail slot to clamp and fix the fitting assembly to the fixed rail and/or slidably adjust the fitting assembly along the fixed rail.

4. The monitor camera mount according to claim 1, wherein the monitor camera mount further comprises a rotary shaft, a first rotary channel is provided on the adjustment assembly, a second rotary channel is provided on the mounting assembly, and the rotary shaft is inserted into the first rotary channel and the second rotary channel so that the mounting assembly is pivotally connected to the adjustment assembly.

5. The monitor camera mount according to claim 4, wherein the locking mechanism comprises a third fastener and a limiting boss provided at the end of the rotary shaft, a limiting surface cooperating with the limiting boss is provided on an inner wall of the first rotary channel to limit the rotary shaft from rotating circumferentially, and the third fastener is in threaded connection with the rotary shaft so that the adjustment assembly and the mounting assembly are limited between an end surface of the third fastener and the limiting boss to limit rotation of the adjustment assembly and the mounting assembly at an angle.

6. The monitor camera mount according to claim 1, wherein the mounting assembly comprises an adjustment plate assembly comprising a first limiting plate and a first adjustment plate arranged at an angle to the first limiting plate, the first adjustment plate is connected to the mounting assembly via an adjustment structure to adjust the distance between the first limiting plate and the mounting assembly to clamp the monitor;

the adjustment structure comprises a plurality of limiting grooves provided on the first adjustment plate and a limiting member connected to the mounting assembly, and limiting protrusions cooperating with the limiting grooves are provided on the limiting member.

7. The monitor camera mount according to claim 6, wherein the monitor camera mount further comprises a support plate, wherein the support plate is telescopically connected to the adjustment assembly so that the support plate cooperates with the first adjustment plate to abut against the back of the monitor;

the support plate is provided with a telescopic guide rail, the monitor camera mount further comprises a second fastener connected to the adjustment assembly, the second fastener, passing through the telescopic guide rail, is connected to a fourth fastener, the fourth fastener is provided with a connection limiting portion, and the fourth fastener locks the support plate between the adjustment assembly and the connection limiting portion of the fourth fastener.

8. The monitor camera mount according to claim 7, wherein a fulcrum between the mounting assembly and the monitor is provided with a first adhesive tape, and/or a fulcrum between the first limiting plate and the monitor is provided with a second adhesive tape; and/or a fulcrum between the support plate and the monitor is provided with a third adhesive tape.

* * * * *